United States Patent
Goda

(10) Patent No.: US 11,829,670 B2
(45) Date of Patent: Nov. 28, 2023

(54) INFORMATION PROCESSING APPARATUS AND CONTROL METHOD FOR INFORMATION PROCESSING APPARATUS

(71) Applicant: CANON KABUSHIKI KAISHA, Tokyo (JP)

(72) Inventor: Keigo Goda, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/590,453

(22) Filed: Feb. 1, 2022

(65) Prior Publication Data

US 2022/0253318 A1    Aug. 11, 2022

(30) Foreign Application Priority Data

Feb. 10, 2021  (JP) ................. 2021-020060

(51) Int. Cl.
*G06F 9/38* (2018.01)
*G06F 9/54* (2006.01)
*G06F 3/12* (2006.01)

(52) U.S. Cl.
CPC ............ *G06F 3/126* (2013.01); *G06F 3/1272* (2013.01)

(58) Field of Classification Search
CPC ... G06F 3/126; G06F 3/1272; G06K 15/1823; G06K 15/1817
See application file for complete search history.

(56) References Cited

U.S. PATENT DOCUMENTS

| | | | | |
|---|---|---|---|---|
| 2009/0018712 A1* | 1/2009 | Duncan | ................ | G09B 19/167 701/2 |
| 2015/0134857 A1* | 5/2015 | Hahn | ...................... | G06F 3/061 710/5 |
| 2020/0195793 A1* | 6/2020 | Tajima | ............... | H04N 1/00477 |

FOREIGN PATENT DOCUMENTS

JP        2011015093 A    1/2011

* cited by examiner

*Primary Examiner* — Iriana Cruz
(74) *Attorney, Agent, or Firm* — Canon U.S.A., Inc. IP Division

(57) ABSTRACT

An information processing apparatus includes a nonvolatile semiconductor storage configured to store image data and a processor configured to generate a command to be executed by the semiconductor storage. The information processing apparatus further includes a volatile memory configured to store the command generated by the processor in one queue of a plurality of queues that includes at least a first queue and a second queue. The semiconductor storage confirms the presence of a command stored in the first queue before confirming the presence of a command stored in the second queue. A command to be stored in the first queue is a first type of command related to image data.

18 Claims, 8 Drawing Sheets

INFORMATION PROCESSING APPARATUS AND CONTROL METHOD FOR INFORMATION PROCESSING APPARATUS

BACKGROUND

Field

The present disclosure relates to an information processing apparatus and a method for controlling the information processing apparatus.

Description of the Related Art

A storage device used by a computer apparatus to store digital data is typically controlled and read/written by a command transmitted from a central processing unit (CPU) to the storage device. Conventional storage devices are typically configured to accept one command at a time. Thus, in a case where a plurality of processes is operated in parallel in a computer apparatus, reading and writing requests to a storage device generated simultaneously are stored in a queue (OS queue) of a random access memory (RAM) corresponding to an operating system (OS), and are processed one by one. The mechanism of such an OS queue is typically provided as an OS function.

In contrast, an image forming apparatus reads and writes image data, such as a digital image read by a scanner apparatus and a digital image to be printed by a printer apparatus, from and to a hard disk or a solid state drive (SSD) as a storage device.

For example, in a document copy function, the image forming apparatus writes image data read by the scanner apparatus in the storage device, causes the printer apparatus to print the image data while reading the image data from the storage device, and copies the document.

Generally, the image forming apparatus includes not only the copy function but also various other functions, and also can operate a plurality of functions in parallel. Some of these functions read and write data other than image data from and to the storage device during operation. In a case where a plurality of functions are operated at the same time as described above, reading and writing operations to the storage device can conflict with each other.

In a case where commands are stored in the OS queue and processed one by one as described above, if reading and writing of data other than image data to the storage device and reading and writing of image data to the storage device conflict with each other, both reading/writing requests are stored in the queue of the RAM and wait for a processing turn. Thus, an image data reading/writing speed may not be constant and may vary depending on the circumstances of a conflict. If the image data reading/writing speed fluctuates, for example, a print speed of the printer apparatus may fluctuate.

In order to stabilize a job execution speed of such an image forming apparatus, it is important to realize reading and writing of the image data at a constant speed as much as possible.

For example, Japanese Patent Application Laid-Open No. 2011-15093 discusses a technique to prevent a decrease in an image data reading/writing speed in a case of a reading/writing conflict in the storage device by not using an OS queue at the time of reading and writing image data.

SUMMARY I/F THE DISCLOSURE

According to various embodiments of the present disclosure, an information processing apparatus includes a nonvolatile semiconductor storage configured to store image data and a processor configured to generate a command to be executed by the nonvolatile semiconductor storage. The information processing apparatus further includes a volatile memory configured to store the command generated by the processor in one queue of a plurality of queues that includes at least a first queue and a second queue. The semiconductor storage confirms the presence of a command stored in the first queue before confirming the presence of a command stored in the second queue. A command to be stored in the first queue is a first type of command related to image data.

Further features of the present disclosure will become apparent from the following description of example embodiments with reference to the attached drawings.

BRIEF DESCRIPTION I/F THE DRAWINGS

DESCRIPTION OF THE EMBODIMENTS

Various example embodiments of the present disclosure will now be described in detail with reference to the attached drawings. The example embodiments described below do not restrict the present invention according to the claims. All of the combinations of the features described in the example embodiments are not always essential to the means for solution according to embodiments of the present invention. In describing the example embodiments, an image processing apparatus is described as an example of an information processing apparatus, but the present invention is not limited to use of an image processing apparatus as the information processing apparatus.

Figure 1:
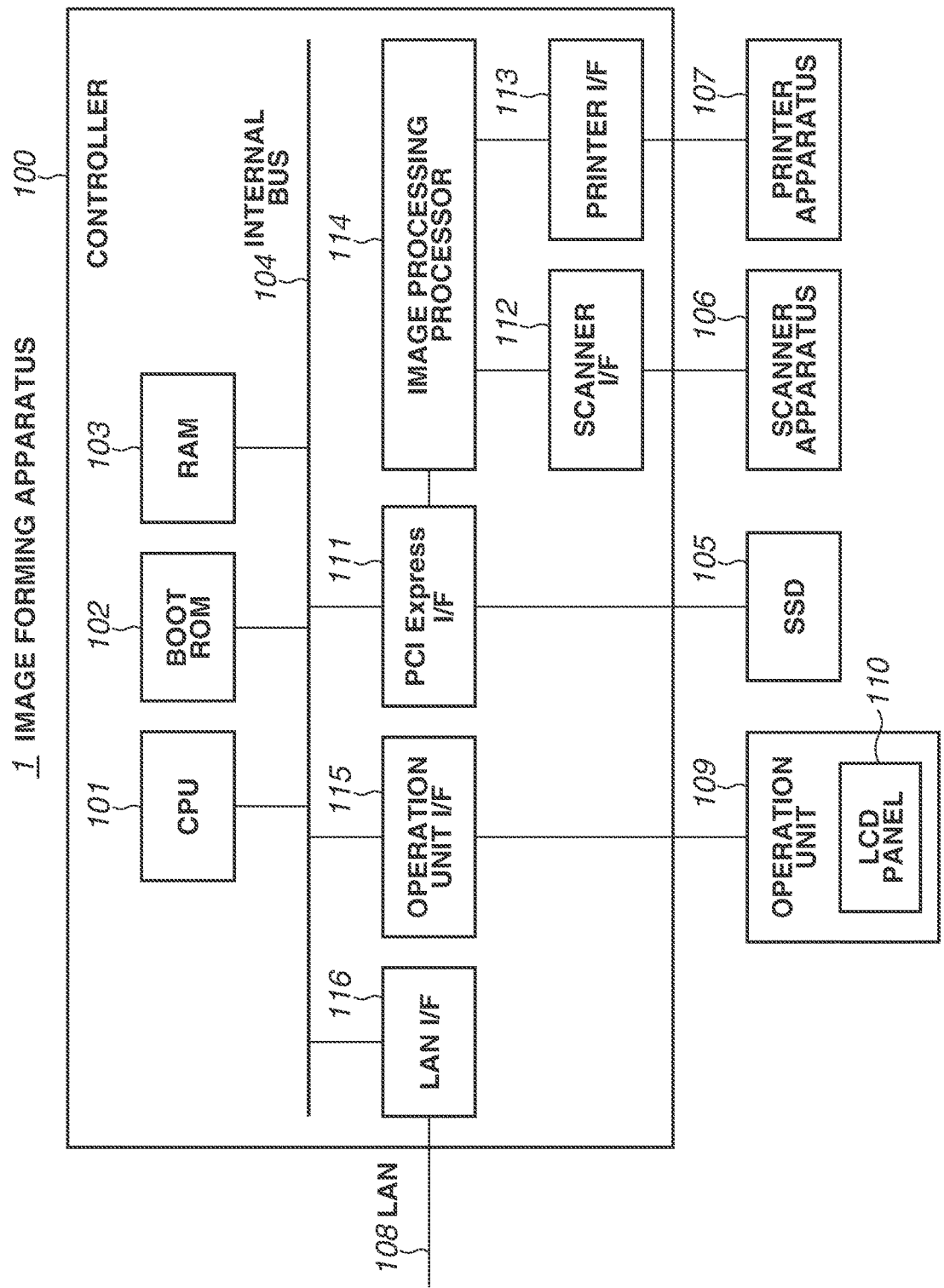
FIG. 1 illustrates a block diagram of an image forming apparatus according to one embodiment.

An aspect for implementing a first example embodiment is described below with reference to the attached drawings. FIG. 1 is a block diagram illustrating an image forming apparatus to which the present example embodiment is applied. An image forming apparatus 1 according to the present example embodiment includes the following configuration.

A scanner apparatus 106 optically reads an image from a document and converts the read image into a digital image. A printer apparatus 107 outputs the digital image to a paper medium. An operation unit 109 performs an operation of the image forming apparatus 1. A solid state drive (SSD) 105 is a nonvolatile semiconductor storage device which can store various types of, for example, firmware, and digital images.

A controller 100 is connected to the above-described components, and the controller 100 executes a job in the image forming apparatus 1 by issuing an instruction to each module.

The image forming apparatus 1 can perform inputting and outputting a digital image to and from an external computer, issuing a job, or remotely controlling a device, via a local area network (LAN) 108.

The controller 100 is a general-purpose computer system. The controller 100 includes a central processing unit (CPU) 101 that controls the entire apparatus, a boot read-only memory (ROM) 102 that includes an initial program referred to as a Basic input/output system (BIOS), and a random access memory (RAM) 103 to be used by the CPU 101 as a main storage memory. These components are connected with each other via an internal bus 104.

In addition to the above-described units, a peripheral component interconnect (PCI) Express interface (I/F) 111 is connected to the internal bus 104. The PCI Express I/F 111 is a bus interface to connect various types of hardware conforming to the PCI Express standard. The controller 100 is connected to the SSD 105 and an image processing processor 114 via the PCI Express I/F 111.

The image processing processor 114 is an application specific integrated circuit (ASIC) for performing real time digital image processing. The scanner apparatus 106 and the printer apparatus 107 are connected to the image processing processor 114 via a scanner I/F 112 and a printer I/F 113, respectively.

The SSD 105 according to the present example embodiment is a high-capacity and high-speed readable and writable SSD connected to the controller 100 via a bus of the PCI Express standard. The SSD 105 conforms to the Non-Volatile Memory Express (NVM Express®) standard which is an industry standard. The SSD 105 is mainly used for storing a program to be executed by the CPU 101 and for storing image data at a time of executing a job.

The controller 100 is further connected to the operation unit 109 via an operation unit I/F 115. The operation unit 109 includes a liquid crystal display (LCD) panel 110 for displaying various types of information to a user and an operation switch (not illustrated) for the user to perform various operations. The controller 100 can be connected to the LAN 108 via a LAN I/F 116.

Figure 2:
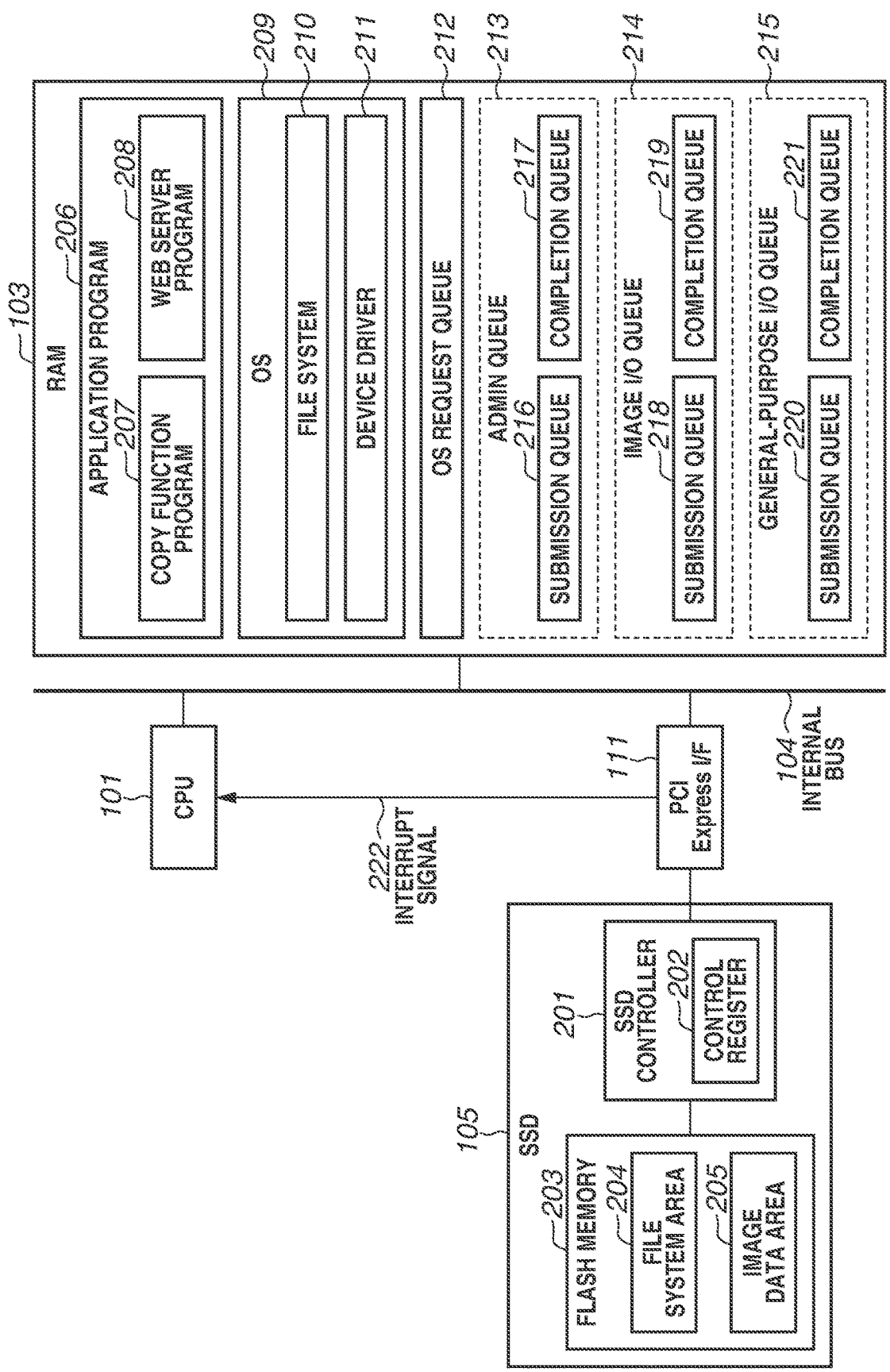
FIG. 2 illustrates a block diagram of a configuration of a storage device control mechanism according to one embodiment.

FIG. 2 is a block diagram illustrating a configuration of the controller 100 in detail by focusing on a part related to control of a storage device, which is a feature of the present example embodiment. In FIG. 2, a part not related to the control of the storage device is omitted.

The SSD 105 includes an SSD controller 201 as a controller circuit for controlling an operation of the SSD 105 based on a command transmitted from the CPU 101. The SSD controller 201 operates the SSD 105 by performing reading and writing on a FLASH memory 203 based on a command. The SSD controller 201 according to the present example embodiment conforms to an NVM Express® standard, and the SSD controller 201 is connected to the PCI Express I/F 111 via a bus conforming to the PCI Express standard.

The SSD controller 201 includes a control register 202 to which the CPU 101 can access to perform control or an operation setting on the SSD controller 201. In FIG. 2, the control register 202 is illustrated as a single register for the sake of simplifying the description. However, the control register 202 may include a plurality of registers, and the configuration according to the present example embodiment is not limited to the above-described configuration.

The SSD controller 201 transmits an interrupt signal 222 to the CPU 101 via the PCI Express I/F 111 in a case where the SSD controller 201 issues some notification to the CPU 101, such as when execution of a command from the CPU 101 is completed.

The FLASH memory 203 is a nonvolatile memory and is used as a data storage location when the SSD 105 is used as a storage device. The FLASH memory 203 according to the present example embodiment includes a file system area 204 and an image data area 205 that are storage areas used for different purposes. The file system area 204 is a storage area managed by a file system 210 described below. The file system area 204 is used as a storage location for various data, such as various program codes executed by the CPU 101, font data, and translation data for each language to be displayed on a screen.

The image data area 205 is a storage location of the image data at a time of job execution. The storage location is not managed by the file system 210, and is a specific storage location where only image data is read or written.

These storage locations are distinguished by software using an operating system (OS) 209 described below and are not distinguished by hardware. In other words, the SSD controller 201 does not recognize existence of the file system area 204 and the image data area 205, and does not change an operation for each storage area as long as the SSD controller 201 is not controlled by the CPU 101.

The RAM 103 is a volatile semiconductor storage device configured to store various programs to be executed by the CPU 101 during the operation of the image forming apparatus 1 and various types of information regarding the control of the SSD 105.

An application program 206 is an executable program, and the CPU 101 controls the controller 100 by executing the application program 206 and realizes various functions of the image forming apparatus 1. The application program 206 is stored in the file system area 204 of the SSD 105, loaded into the RAM 103 when the image forming apparatus 1 is started up, and executed by the CPU 101.

The application program 206 according to the present example embodiment includes a copy function program 207 and a web server program 208.

The copy function program 207 is a program for realizing a copy function of the image forming apparatus 1. Image data generated by reading a document with the scanner apparatus 106 is written to the image data area 205, the image data in the image data area 205 is read and printed on a sheet by the printer apparatus 107, and thereby a copy job is executed. The copy function program 207 basically handles only image data.

The web server program 208 is a program for processing communication from the external computer to the image forming apparatus 1 via the LAN 108 using a web browser, and a program for realizing remote management of the image forming apparatus 1 via the LAN 108. The web server program 208 reads various data, such as translation data for each language to be displayed on the screen, from the file system area 204 when the web server program 208 responds to the communication from the external computer. The web server program 208 basically does not handle image data.

According to the present example embodiment, the copy function program 207 and the web server program 208 are illustrated as a function included in the application program 206. However, the configuration is merely an example. The copy function program 207 and the web server program 208 may be separate programs that operate independently.

The function realized by the copy function program 207 and the web server program 208 is just an example of the function of the image forming apparatus 1. The image forming apparatus 1 may also have functions other than the above-described functions, such as a facsimile (FAX) function, and the application program 206 may further include a program for realizing the functions. The present example embodiment is not limited to the configuration illustrated in the drawings.

The OS 209 is an operating system to control hardware of the controller 100 by using the CPU 101. When the application program 206 performs reading and writing on the SSD 105, reading and writing is realized by calling a function of the OS 209. The OS 209 according to the present example embodiment includes the file system 210 and a device driver 211.

The file system 210 is a program for managing the storage area in the storage device and providing a function to enable reading and writing of various data as a file. The function provided by the file system 210 is used for normal reading and writing of data performed by the application program 206 on the SSD 105.

The device driver 211 is a program having a function of controlling an SSD conforming to the NVM Express® standard, and is incorporated in the OS 209 to control the SSD 105. In reading and writing to the SSD 105 using the file system 210, a reading/writing request is issued from the file system 210 to the device driver 211, and reading/writing is realized by the device driver 211 processing the reading/writing request.

The device driver 211 according to the present example embodiment provides a direct access function of directly reading and writing image data from and to the SSD 105 without performing via the file system 210. In a case where the copy function program 207 reads and writes image data from and to the SSD 105, the direct access function is used.

Providing two reading/writing methods to the same storage area increases complexity of a program and is not suitable. Thus, the storage areas are divided by the software for each reading/writing method according to the present example embodiment. The file system area 204 is assigned to the storage area to be read and written using the function of the file system 210, and the image data area 205 is assigned to the storage area to be accessed using the direct access function of the device driver 211.

An OS request queue 212 is a memory area capable of storing a plurality of reading/writing requests to the SSD 105, which have been issued from the file system 210 to the device driver 211. The image forming apparatus 1 according to the present example embodiment can execute a plurality of functions in parallel at the same time, and the web server program 208 may receive communication from a plurality of external computers at the same time via the LAN 108 in some cases. For this reason, the file system 210 may issue a plurality of reading/writing requests at the same time, and the memory area for storing the plurality of reading/writing requests is required. As described below, the SSD controller 201 can accept a plurality of commands. However, the number of commands which can be accepted is limited, and thus the reading/writing requests exceeding the number are retained in the OS request queue 212.

An administration (Admin) queue 213 is a memory area used by the CPU 101 to transmit and receive a command conforming to the NVM Express® standard between the SSD controller 201 to control the SSD 105. The commands issued by the CPU 101 to the SSD controller 201 are all transmitted via the memory area allocated in the RAM 103.

The Admin queue 213 is configured with a submission queue 216 used for transmitting the command and a completion queue 217 used for receiving a command execution result.

Figure 3:
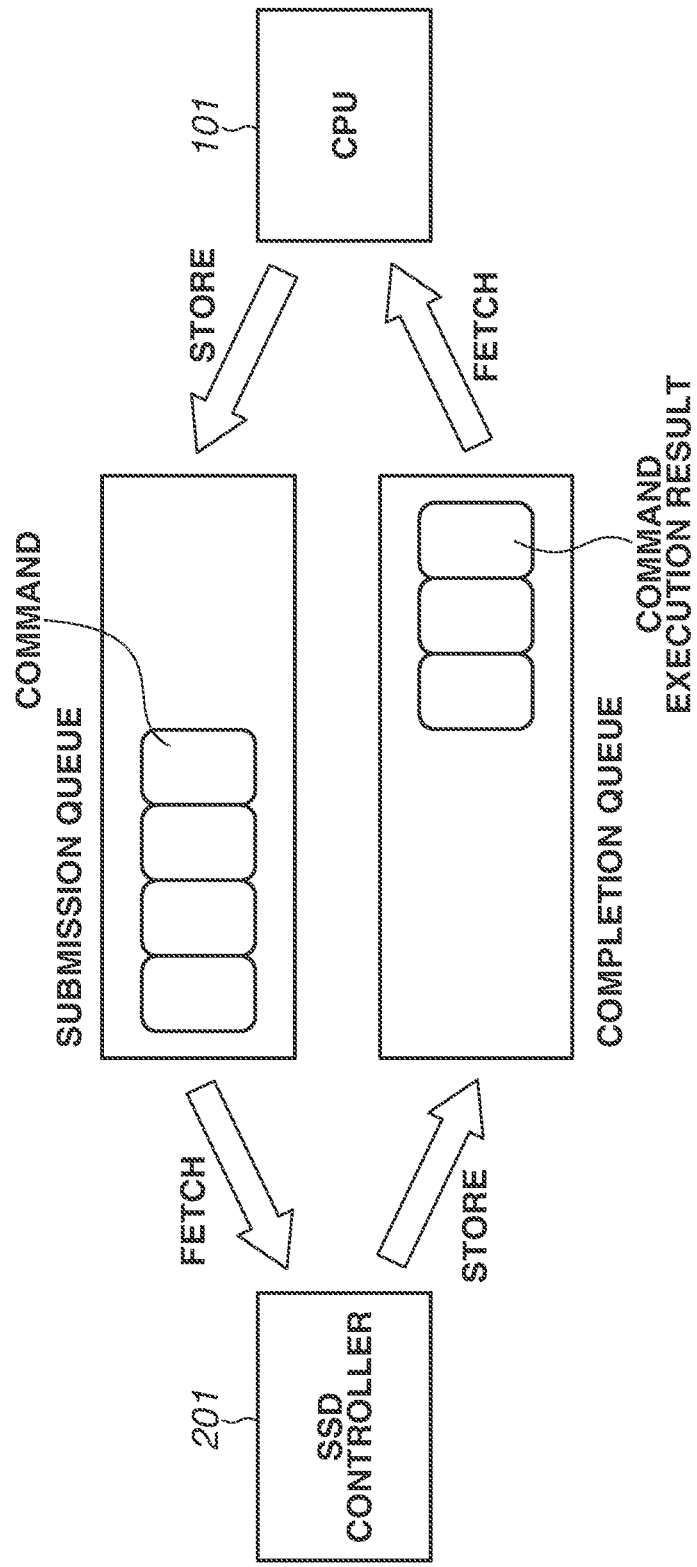
FIG. 3 is a schematic diagram illustrating a concept of a queue in a solid state drive (SSD) according to one embodiment.

FIG. 3 is a schematic diagram illustrating roles of the submission queue and the completion queue in the SSD 105. First, the CPU 101 stores a command to be issued to the SSD 105 in the submission queue.

The SSD controller 201 then fetches the command from the submission queue and executes the command. Then, the SSD controller 201 stores information serving as a command execution result, such as whether execution of the command succeeded or failed, in the completion queue. Finally, the CPU 101 fetches the command execution result from the completion queue, and the execution of the command is completed.

At this time, the CPU 101 may store a new command in the submission queue without waiting for the execution result of the command previously stored in the submission queue to be stored in the completion queue by the SSD controller 201. The SSD controller 201 can accept a plurality of commands stored in the submission queue. However, there is an upper limit to the number of commands that can be stored in the submission queue due to hardware constraints of the SSD controller 201, and the CPU 101 cannot store the number of commands which exceeds the upper limit.

The SSD 105 conforming to the NVM Express® standard has a specification in which a command for initializing and setting the SSD 105 itself and a command for reading and writing data are using different queues to exchange. The Admin queue 213 is used for the command for initializing and setting the SSD 105 itself. The command for reading and writing data is exchanged using an image input/output (I/O) queue 214 or a general-purpose I/O queue 215 that are described below. In the SSD 105 conforming to the NVM Express® standard, the SSD controller 201 is set, so that a plurality of queues can be used for the command for reading and writing data.

The description is returned to FIG. 2. The image I/O queue 214 and the general-purpose I/O queue 215 store different types of commands.

The image I/O queue 214 is a memory area in which the CPU 101 exchanges a reading/writing command for image data with the SSD 105. Specifically, the image I/O queue 214 reads and writes image data generated by the scanner apparatus 106 and image data to be printed on a sheet by the printer apparatus 107 from and to the SSD 105. The image I/O queue 214 functions as a storage unit configured with a submission queue 218 and a completion queue 219.

The general-purpose I/O queue 215 is the memory area used by the CPU 101 to exchange a reading/writing command for data other than image data with the SSD 105. Specifically, the general-purpose I/O queue 215 is used to, for example, read and write data from and to the SSD 105 based on an operation from a remote user interface (RUI). The general-purpose I/O queue 215 functions as a storage unit configured with a submission queue 220 and a completion queue 221.

Figure 4:
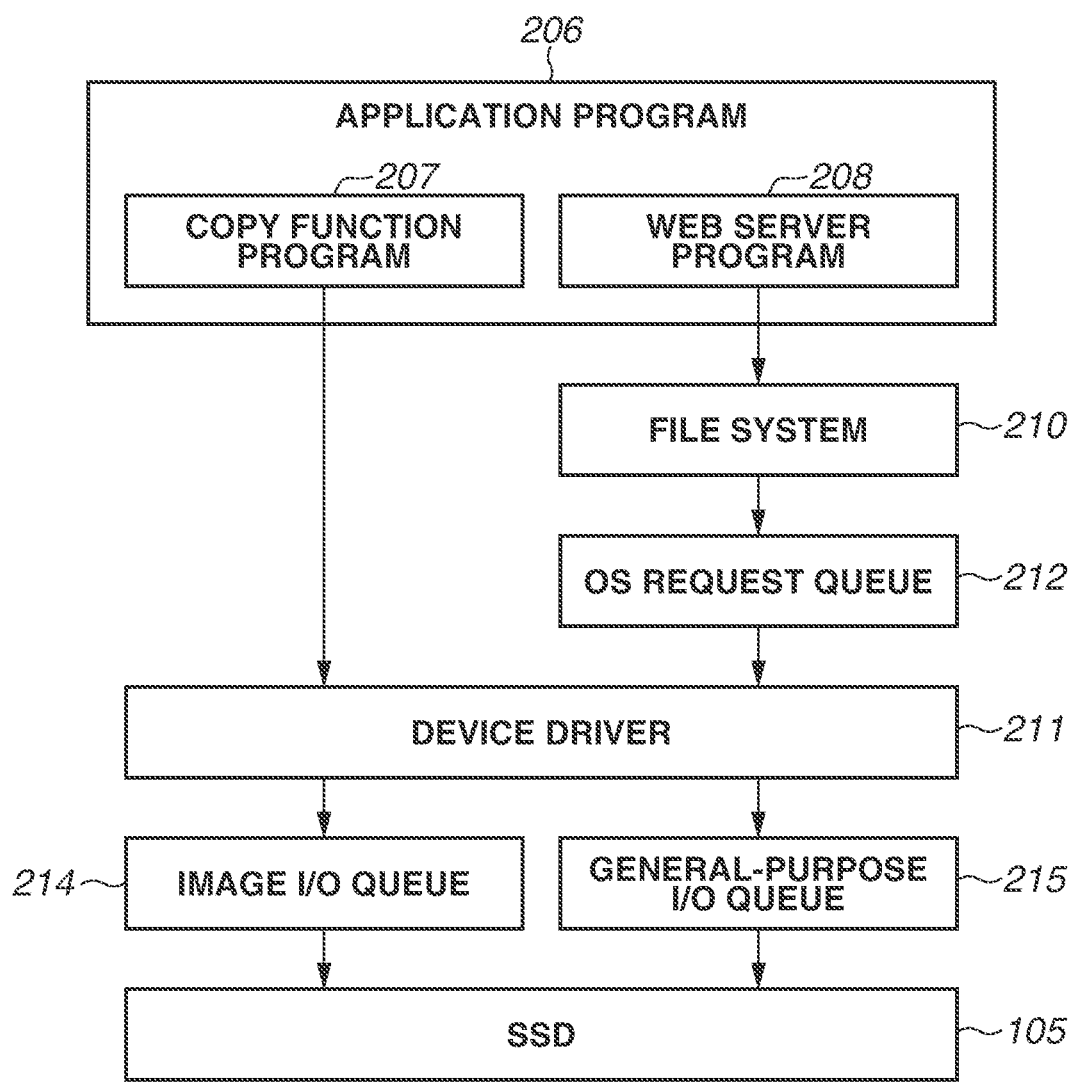
FIG. 4 illustrates a block diagram of a transmission path for a reading/writing request to the SSD according to one embodiment.

Roles of the above-described submission queue 220 and the completion queue 221 are similar to that of the Admin queue 213. FIG. 4 is a schematic diagram illustrating how a request for performing reading/writing on the SSD 105 is transmitted between such a plurality of programs or memory areas.

According to the present example embodiment, there are two transmission paths, one for reading and writing image data and the other for reading and writing data other than image data. Which of the two transmission paths is selected is determined by which function in the OS 209 is called by the application program 206 to perform reading and writing on the SSD 105.

First, a transmission path of a reading/writing request in reading and writing image data of former case is described. Such a case corresponds to a transmission path illustrated in a left side in FIG. 4.

In a case where the copy function of the image forming apparatus 1 is operated, the copy function program 207 executed by the CPU 101 calls the direct access function provided by the device driver 211 and directly transmits the reading/writing request of the image data to the device driver 211. The device driver 211 executed by the CPU 101 stores a command defined by the NVM Express® standard in the image I/O queue 214 based on the reading/writing request from the copy function program 207, and the command is transmitted to the SSD 105.

Next, a transmission path of a reading/writing request in reading and writing data other than image data of a latter case is described. This case corresponds to a transmission path illustrated in a right side of FIG. 4. In a case where a remote management function of the image forming apparatus 1 is operated, the web server program 208 operated by the CPU 101 calls the file system 210 to request reading and writing a file.

The file system 210 operated by the CPU 101 stores the reading/writing request for the SSD 105 in the OS request queue 212. The device driver 211 operated by the CPU 101 then fetches the reading/writing request from the OS request queue 212 and stores the command defined by the NVM Express® standard in the general-purpose I/O queue 215 based on the fetched request. The command is transmitted to the SSD 105, accordingly.

Figure 5A:
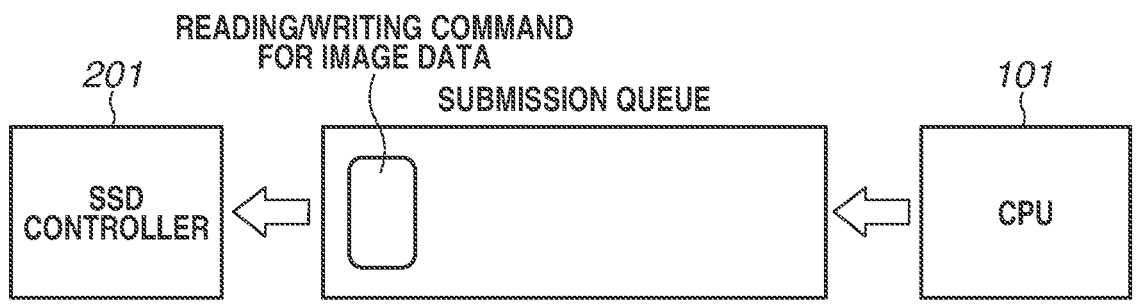
FIGS. 5A to 5C are schematic diagrams illustrating an effect of a queue for an image data reading/writing command according to one embodiment.
Figure 5B:
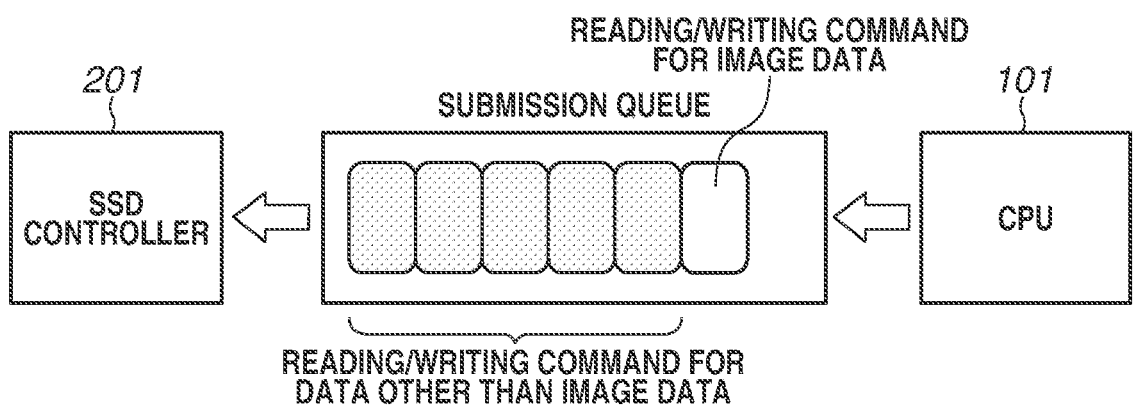
Figure 5C:
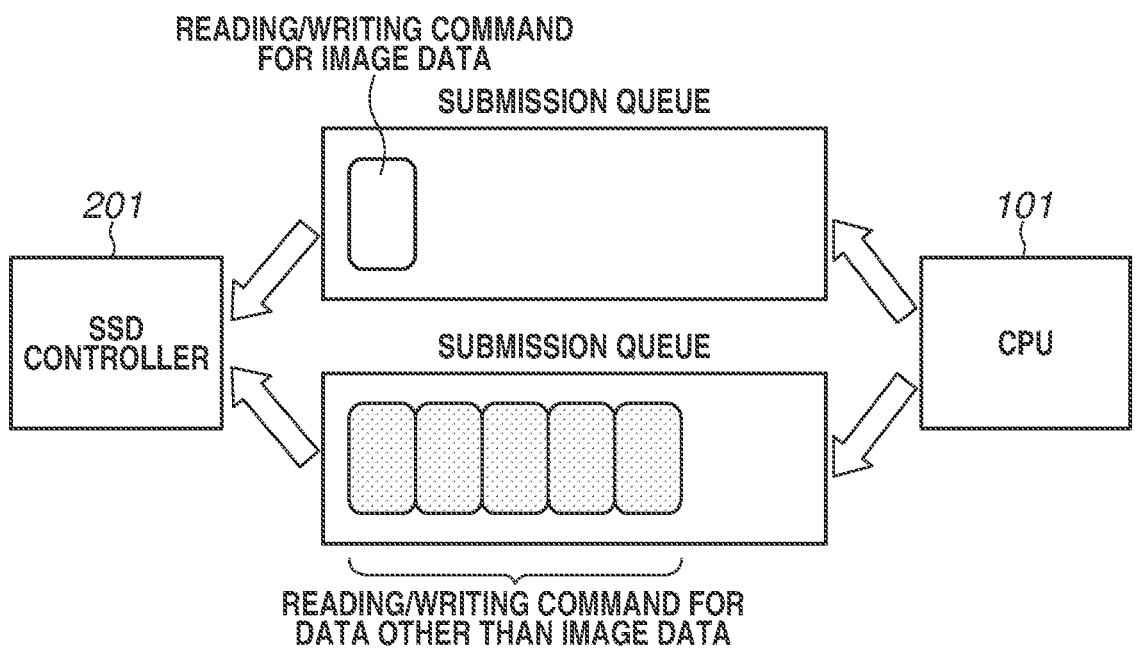

As described above, the image forming apparatus 1 according to the present example embodiment has a configuration in which separate queues are used for the reading/writing command for image data and for the reading/writing command for data other than image data. FIGS. 5A to 5C are schematic diagrams illustrating an effect of adopting such a configuration.

First, a conventional configuration is described. FIGS. 5A and 5B illustrate a case in which the same queue is used for the reading/writing command for image data and the reading/writing command for data other than image data. Specifically, there is no distinction between the image I/O queue 214 and the general-purpose I/O queue 215, and one queue is used. The image forming apparatus 1 may operate a plurality of functions at the same time, and reading and writing to the SSD 105 by the plurality of functions may occur in parallel at the same time, so that reading and writing may conflict with each other.

FIG. 5A illustrates a case in which the image data is read and written in a state in which a conflict does not occur. In a case where the command stored in the submission queue is only the command for reading and writing image data as illustrated in FIG. 5A, a time until execution completion of the command is short.

However, in a state in which a conflict occurs, many commands wait for execution in the submission queue as illustrated in FIG. 5B, and a time until execution completion of the command is long.

In other words, in a case where the same queue is used, an image data reading/writing speed varies depending on whether there is a conflict in reading and writing to the SSD 105. If the image data reading/writing speed varies, a job execution speed of the image forming apparatus 1 such as a print speed may vary depending on a situation.

In contrast, FIG. 5C illustrates a configuration of the present example embodiment in which separate queues are used for the reading/writing command for image data and the reading/writing command for data other than image data. Even if there is a conflict in reading and writing to the SSD 105, the reading/writing command for image data and the reading/writing command for data other than image data are stored in separate queues and wait for a processing order as illustrated in FIG. 5C. In a case where the SSD controller 201 fetches and processes a command from each of the two submission queues, a time until the command for reading and writing image data is executed is not long even if a conflict occurs.

In addition, some SSDs conforming to the NVM Express® standard (NVMESSDs) can set priorities for the submission queues. In such a case, the SSD controller 201 can process the reading/writing command for image data first by setting a high priority for the image I/O queue 214, and even if the conflict occurs, the image data can be read and written at the same speed as that when there is no conflict.

As described above, the present example embodiment can reduce a fluctuation in the image data reading/writing speed by using separate queues and thereby preventing a job execution speed from varying depending on the situation.

A specific method for realizing the configuration of the present example embodiment is described below with reference to the attached drawings.

Figure 6:
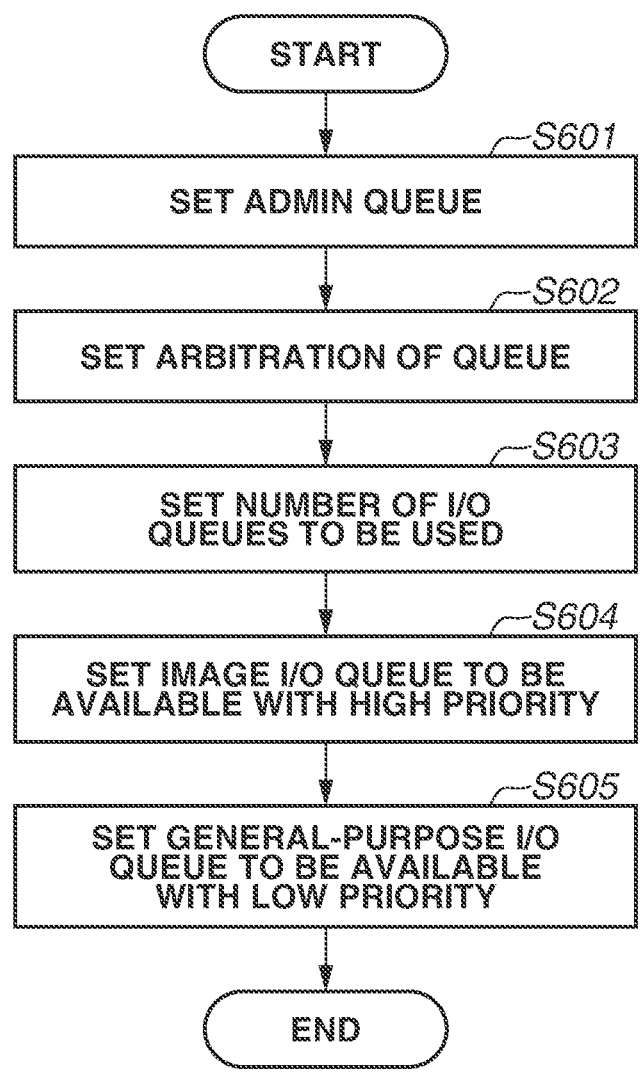
FIG. 6 illustrates a flowchart of an initialization procedure for the SSD at a time of start-up according to one embodiment.

FIG. 6 is a flowchart illustrating an initial setting operation performed on the SSD 105 by the CPU 101 at the time of start-up of the controller 100 according to the present example embodiment. The CPU 101 executes the BIOS an initial program stored in the boot ROM 102 when a power source of the image forming apparatus 1 is turned on, and loads the OS 209 from the SSD 105 into the RAM 103. A start-up operation of the controller 100 according to the present example embodiment is thereby executed. Only an initialization operation of the SSD 105 at the time of start-up is described here.

FIG. 6 is the flowchart for performing the initial setting on the SSD 105 which is executed once at the time of start-up after the OS 209 is loaded into the RAM 103. The CPU 101 executes the processing flow by executing the device driver 211 in the OS 209.

In step S601, the CPU 101 performs setting on the SSD 105 to make the Admin queue 213 available. The CPU 101 accesses the control register 202 of the SSD controller 201 via the PCI Express I/F 111. The CPU 101 registers addresses of the memory areas to be used as the submission queue 216 and the completion queue 217 in the RAM 103. After this, the SSD controller 201 can perform reading and writing on the submission queue 216 and the completion queue 217 via the PCI Express I/F 111, and the Admin queue 213 becomes available.

In step S602, the CPU 101 sets arbitration of the queue with respect to the SSD 105. In the SSD conforming to the NVM Express® standard, the submission queue can be operated by setting the priority. In that case, however, it is necessary to set the arbitration of the queue in advance. The CPU 101 accesses the control register 202 and sets a Weighted Round Robin with Urgent Priority Class in an arbitration mechanism. The present example embodiment is also effective even in a case where the submission queue is not operated by setting the priority. In this case, a Round Robin is set in the arbitration mechanism. To obtain a better effect, it is desirable to operate the submission queue by setting the priority.

In step S603, the CPU 101 sets the number of I/O queues to be used for the SSD 105. The SSD conforming to the NVM Express® standard can exchange commands using a plurality of I/O queues. The CPU 101 therefor transmits a Set Features command to the SSD 105 via the Admin queue 213 and sets a "Number of Queues" setting value. The number of submission queues and the number of completion queues can be set separately, but the same number of two is set as an example according to the present example embodiment.

In step S604, the CPU 101 sets the image I/O queue 214 to be available. The CPU 101 first transmits a Create I/O Completion Queue command to the SSD 105 via the Admin queue 213. The CPU 101 then notifies the SSD controller 201 of a memory address of the completion queue 219 and makes the completion queue 219 available. The CPU 101 further transmits a Create I/O Submission Queue command to the SSD 105 via the Admin queue 213. The CPU 101 then notifies the SSD controller 201 of an identifier of the completion queue 219 and a memory address of the submission queue 218 and makes the submission queue 218 available. At that time, the CPU 101 notifies the SSD controller 201 of the priority to be set to the submission queue 218. The priority to be set may be anything as long as it is higher than that of the submission queue 220. The image I/O queue 214 becomes available, accordingly. In step S605, the CPU 101 sets the general-purpose I/O queue 215 to be available.

The CPU 101 transmits the Create I/O Completion Queue command to the SSD 105 via the Admin queue 213. The CPU 101 then notifies the SSD controller 201 of a memory address of the completion queue 221 and makes the completion queue 221 available. The CPU 101 further transmits the Create I/O Submission Queue command to the SSD 105 via the Admin queue 213. The CPU 101 notifies the SSD controller 201 of an identifier of the completion queue 221 and a memory address of the submission queue 220 and makes the submission queue 220 available. At this time, the CPU 101 notifies the SSD controller 201 of the priority to be set to the submission queue 220. The priority to be set may be anything as long as it is lower than that of the submission queue 218. The general-purpose I/O queue 215 becomes available, accordingly.

Figure 7A:
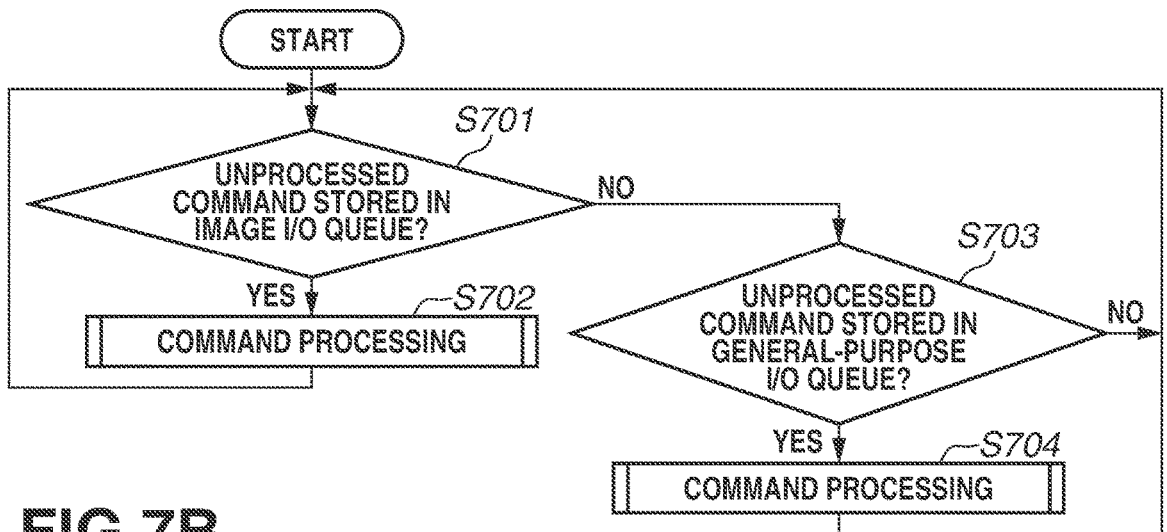
FIGS. 7A to 7C illustrate flowcharts of operations of an SSD controller according to one embodiment.
Figure 7B:
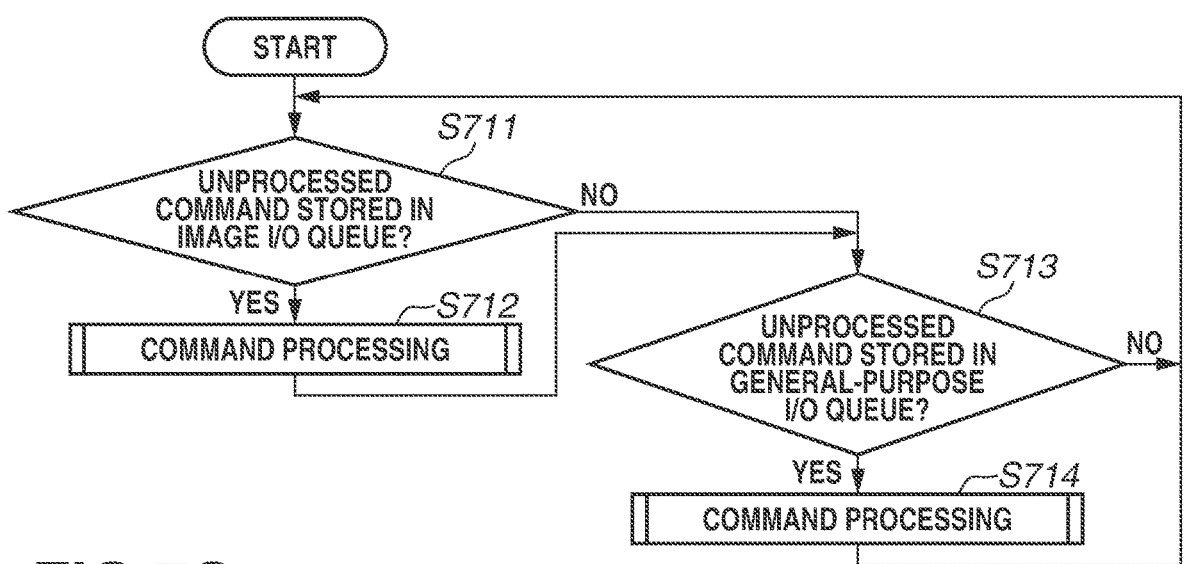
Figure 7C:
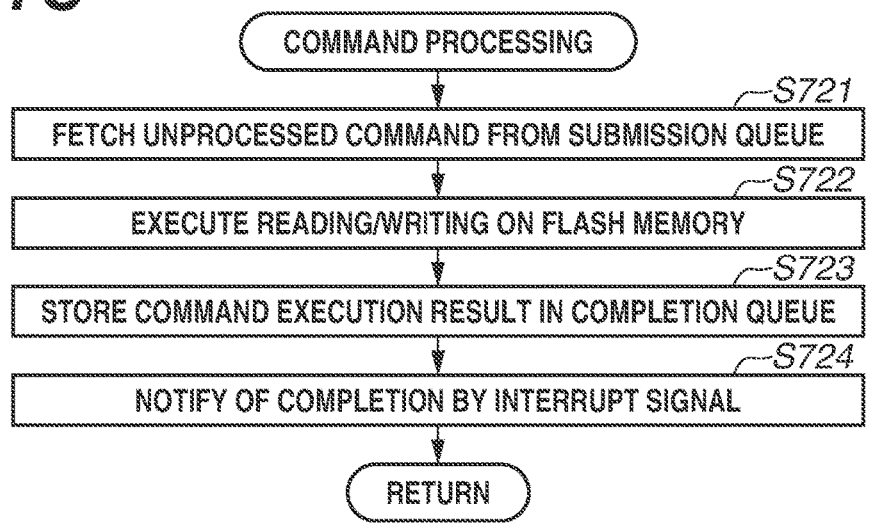

FIGS. 7A to 7C illustrates how the SSD controller 201 of the SSD 105 set as described above performs an operation during the operation of the image forming apparatus 1. FIGS. 7A to 7C are flowcharts illustrating operations executed by the SSD controller 201 upon receiving a reading/writing command with respect to the SSD 105 transmitted from the CPU 101.

In a case where it is set so that the submission queue is operated by setting the priority, the SSD controller 201 is in a state for executing processing flow illustrated in the flowchart in FIG. 7A.

In step S701, the SSD controller 201 checks whether an unprocessed command is stored in the image I/O queue 214. If the unprocessed command is stored (YES in step S701), the SSD controller 201 advances the processing to step S702. If the unprocessed command is not stored (NO in step S701), the SSD controller 201 advances the processing to step S703.

In step S702, the SSD controller 201 processes one command stored in the image I/O queue 214. Command processing is described in detail below with reference to FIG. 7C. When the command processing in the image I/O queue 214 is completed, the SSD controller 201 returns the processing to step S701.

In step S703, the SSD controller 201 checks whether an unprocessed command is stored in the general-purpose I/O queue 215. If the unprocessed command is stored (YES in step S703), the SSD controller 201 advances the processing to step S704. If the unprocessed command is not stored (NO in step S703), the SSD controller 201 returns the processing to step S701.

In step S704, the SSD controller 201 processes one command stored in the general-purpose I/O queue 215. When the command processing in the general-purpose I/O queue 215 is completed, the SSD controller 201 returns the processing to step S701.

FIG. 7C is a flowchart illustrating details of the command processing. The flowchart is common to the processing performed on the image I/O queue 214 and the processing performed on the general-purpose I/O queue 215. In the subsequent processing flow, the submission queue 218 or 220 and the completion queue 219 or 212 respectively correspond to a case where a processing target is the image I/O queue 214 and a case in which a processing target is the general-purpose I/O queue 215.

In step S721, the SSD controller 201 fetches an unprocessed command from the submission queue. In step S722, the SSD controller 201 executes reading and writing on the FLASH memory 203. If the fetched command is a write command, the SSD controller 201 executes writing data to the FLASH memory 203 based on a parameter of the command. In a case of a read command, the SSD controller 201 executes reading data from the FLASH memory 203.

In step S723, the SSD controller 201 stores a command execution result generated in step S722 in the completion queue. The command execution result includes information such as whether the reading/writing on the FLASH memory 203 is successful.

In step S724, the SSD controller 201 notifies the CPU 101 of the interrupt signal 222 via the PCI Express I/F 111. The SSD controller 201 notifies the CPU 101 using the interrupt signal 222 that the execution of the command has been completed, and the execution result has been stored in the completion queue.

The processing flow of the command processing is completed in the above-described steps, and the SSD controller 201 returns the processing to the original flow.

In contrast, FIG. 7B is a flowchart illustrating processing flow executed by the SSD controller 201 in a case where the submission queue is set to be operated without a setting of the priority. In this case, the SSD controller 201 executes the processing flow illustrated in FIG. 7B instead of the flowchart illustrated in FIG. 7A. Here, an example has been described in which presence or absence of an unprocessed command in the image I/O queue 214 is checked first if the priority is not set. However, an unprocessed command in the general-purpose I/O queue 215 may be confirmed first.

In step S711, the SSD controller 201 checks whether an unprocessed command is stored in the image I/O queue 214. If the unprocessed command is stored (YES in step S711), the SSD controller 201 advances the processing to step S712. If the unprocessed command is not stored (NO in step S711), the SSD controller 201 advances the processing to step S713.

In step S712, the SSD controller 201 processes one command stored in the image I/O queue 214. When the command processing has been completed, the SSD controller 201 advances the processing to step S713.

In step S713, the SSD controller 201 checks whether an unprocessed command is stored in the general-purpose I/O queue 215. In a case where the unprocessed command is stored (YES in step S713), the SSD controller 201 advances the processing to step S714. In a case where the unprocessed command is not stored (NO in step S713), the SSD controller 201 returns the processing to step S711. In step S714, the SSD controller 201 processes one command stored in the general-purpose I/O queue 215. If the command processing is completed, the SSD controller 201 returns the processing to step S711.

In the processing flow illustrated in FIG. 7A, the unprocessed command is processed first while the unprocessed command exists in the image I/O queue 214, whereas in the processing flow in FIG. 7B, if the unprocessed commands are stored in both the image I/O queue 214 and the general-purpose I/O queue 215, the unprocessed command is processed alternately.

Figure 8:
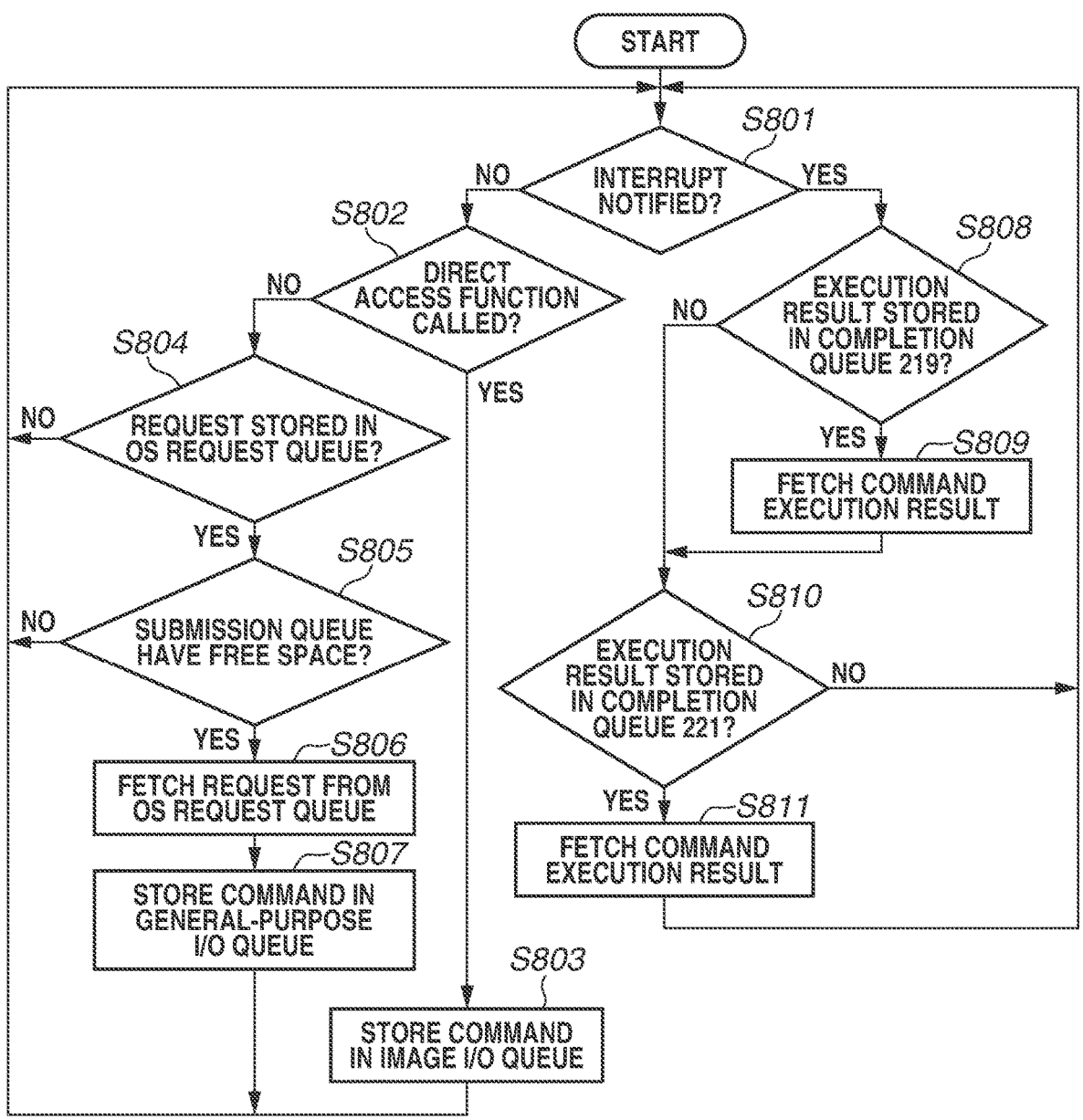
FIG. 8 illustrates a flowchart of operations of a device driver according to one embodiment.

FIG. 8 is a flowchart illustrating an operation of the device driver 211 during operation of the image forming apparatus 1. The processing flow described below is executed by the CPU 101 executing the device driver 211.

In step S801, the CPU 101 determines whether the interrupt signal 222 is notified. If the interrupt signal 222 is notified (YES in step S801), it means that execution of the command transmitted to the SSD 105 is completed, and the CPU 101 advances the processing to step S808. In a case where the interrupt signal 222 is not notified (NO in step S801), the CPU 101 advances the processing to step S802.

In step S802, the CPU 101 determines whether the above-described direct access function provided by the device driver 211 is called by the application program 206. If the direct access function is called (YES in step S802), in other words, if the copy function program 207 intends to perform reading and writing of image data on the SSD 105 to execute a job, the CPU 101 advances the processing to step S803. If the direct access function is not called (NO in step S802), the CPU 101 advances the processing to step S804.

In step S803, the CPU 101 stores a command for performing reading and writing on the SSD 105 defined by the NVM Express® standard in the image I/O queue 214 based on the reading/writing request of the image data via the direct access function.

The CPU 101 stores the command in the submission queue 218 and notifies the SSD controller 201 of a storage location of the command newly stored in the memory area by writing the storage location in the control register 202.

The SSD controller 201 enters a state of recognizing the storage of the command, accordingly. In a case of the image forming apparatus 1, processing for handling the image data is processing for operating the printer apparatus 107 or the scanner apparatus 106, and thus there is a restriction on a parallel operation. It is thereby not necessary to consider a possibility of running out of a space in the submission queue 218. After storing the command in the image I/O queue 214, the CPU 101 returns the processing to step S801.

In step S804, the CPU 101 checks whether the reading/writing request to the SSD 105 is stored in the OS request queue 212. If the reading/writing request is stored (YES in step S804), the CPU 101 advances the processing to step S805. If the reading/writing request is not stored (NO in step S804), the CPU 101 returns the processing to step S801.

In step S805, the CPU 101 checks whether the submission queue has a free space for storing a new command. This can be determined by referring to the control register 202. If there is a free space (YES in step S805), the CPU 101 advances the processing to step S806. If there is no free space (NO in step S805), the CPU 101 returns the processing to step S801.

In step S806, if the reading/writing request is stored in the OS request queue 212 and the submission queue 220 has a free space, the CPU 101 fetches the reading/writing request for the SSD 105 from the OS request queue 212 and advances the processing to step S807.

In step S807, the CPU 101 stores a command for performing reading and writing on the SSD 105 defined by the NVM Express® standard in the general-purpose I/O queue 215 based on the reading/writing request fetched from the OS request queue 212 in previous step S806. The CPU 101 stores the command in the submission queue 220 and notifies the SSD controller 201 of a storage location of the command newly stored in the memory area by writing the storage location in the control register 202. The CPU 101 then returns the processing to step S801.

In step S808, in other words, if the interrupt signal 222 is notified in step S801, the CPU 101 first checks whether the command execution result is stored in the completion queue 219. Whether the execution result is stored can be determined by referring to the control register 202. If the execution result is stored (YES in step S808), the CPU 101 advances the processing to step S809. If the execution result is not stored (NO in step S808), the CPU 101 advances the processing to step S810.

In step S809, the CPU 101 fetches the command execution result from the completion queue 219 and advances the processing to step S810.

In step S810, the CPU 101 checks whether the command execution result is stored in the completion queue 221. If the execution result is stored (YES in step S810), the CPU 101 advances the processing to step S811. If the execution result is not stored (NO in step S810), the CPU 101 returns the processing to step S801.

In step S811, the CPU 101 fetches the command execution result from the completion queue 221 and returns the processing to step S801.

As described above, the image forming apparatus according to the present example embodiment can reduce a fluctuation in the image data reading/writing speed in a case where the image forming apparatus uses a storage device having a mechanism of a queue for accepting a command. The image forming apparatus can thereby suppress a fluctuation in a job execution speed and stabilize an operation speed of the image forming apparatus.

According to the present example embodiment, the SSD conforming to the NVM Express® standard is used as the storage device. However, the above-described configuration is a merely example, and the present example embodiment is not limited to the above-described configuration. The present example embodiment can be applied to any storage device that provides a function of a queue for accepting a plurality of commands as a function of the storage device and has a configuration in which a plurality of queues can be used.

According to the present example embodiment, the SSD 105 is directly connected to the PCI Express I/F 111 of the controller 100. However, the configuration is also an example. A configuration may be adopted in which some bridge device for relaying between devices conforming to the PCI Express standard is provided between the PCI Express I/F 111 and the SSD 105, and the present example embodiment is not limited to the described configuration.

According to the present example embodiment, two I/O queues, e.g., the image I/O queue and the general-purpose I/O queue are used. However, the configuration is an example. A configuration in which two or more I/O queues are used for reading and writing data other than image data or, in contrast, a configuration in which a plurality of I/O queues for image data is used may be adopted, and the present example embodiment is not limited to the described configuration. However, from a viewpoint of giving priority to reducing a fluctuation in a reading/writing time of image data as the image forming apparatus, it is desirable that the number of the I/O queues to be used for data other than image data is small.

Furthermore, the device driver 211 determines whether the image data is accessed based on whether the request is from the direct access function and selects the I/O queue to be used for transmitting the command, according to the present example embodiment. However, such a configuration is also an example. For example, it may be configured to determine whether the image data is accessed based on whether an area to be a reading/writing target in the SSD 105 is the file system area 204 or the image data area 205. The present example embodiment is also not limited to this configuration.

Various examples and example embodiments of the present disclosure have been described above, but the gist and the scope of the present invention are not limited to the specific description contained in the present specification.

OTHER EMBODIMENTS

Various embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While example embodiments have been described, it is to be understood that the invention is not limited to the disclosed example embodiments. The scope of the following claims is to be accorded the broadest interpretation so as to encompass all such modifications and equivalent structures and functions.

This application claims the benefit of Japanese Patent Application No. 2021-020060, filed Feb. 10, 2021, which is hereby incorporated by reference herein in its entirety.

What is claimed is:

1. An information processing apparatus that includes a nonvolatile semiconductor storage configured to store image data and a processor configured to generate a command to be executed by the nonvolatile semiconductor storage, the information processing apparatus comprising:
 a volatile memory configured to store the command generated by the processor in one queue of a plurality of queues that includes at least a first queue and a second queue,
 wherein a command to be stored in the first queue is a first type of command related to image data,
 wherein the nonvolatile semiconductor storage confirms the presence of a command stored in the first queue before confirming the presence of a command stored in the second queue, and
 wherein, in a state in which the first queue stores a plurality of the first type of commands, the nonvolatile semiconductor storage checks whether a second type of command is stored in the second queue after acquiring one of the plurality of the first type of commands stored in the first queue.

2. The information processing apparatus according to claim 1, wherein, in a case where a plurality of commands is stored in the first queue, the nonvolatile semiconductor storage acquires the plurality of the first type of commands from the first queue.

3. The information processing apparatus according to claim 2, wherein the processor sets the nonvolatile semiconductor storage with a setting to prioritize the first queue over the second queue.

4. The information processing apparatus according to claim 2, wherein, in a state in which the first queue stores the plurality of the first type of commands, the nonvolatile semiconductor storage acquires all of the first type of commands stored in the first queue and then confirms whether the second type of command is stored in the second queue.

5. The information processing apparatus according to claim 4, wherein the nonvolatile semiconductor storage acquires the second type of command from the second queue by referring to the fact that the second type of command is stored in the second queue.

6. The information processing apparatus according to claim 1, wherein the second type of command is a command generated by accepting an operation via a remote user interface (RUI), the RUI to be used in a case where the information processing apparatus is operated by a different information processing apparatus.

7. The information processing apparatus according to claim 1, further comprising a printer configured to print image data on a sheet,
 wherein the first type of command is a command for reading the image data to be used by the printer, from the nonvolatile semiconductor storage.

8. The information processing apparatus according to claim 1, further comprising a scanner configured to read a document and generate image data,
 wherein the first type of command is a command for writing the image data generated by the scanner, to the nonvolatile semiconductor storage.

9. The information processing apparatus according to claim 1, wherein the nonvolatile semiconductor storage is a non-volatile memory express solid state drive (NVMESSD).

10. A method for controlling an information processing apparatus that includes a nonvolatile semiconductor storage configured to store image data and a processor configured to generate a command to be executed by the nonvolatile semiconductor storage, the method comprising:
- storing a first type of command related to image data in a first queue and storing a second type of command not related to image data in a second queue;
- collectively acquiring at least one command from one of the first queue and the second queue by the nonvolatile semiconductor storage; and
- executing at least one command of the first type of command stored in the first queue with priority over the second type of command stored in the second queue,
- wherein, in a state in which the first queue stores a plurality of the first type of commands, checking, by the nonvolatile semiconductor storage, whether the second type of command is stored in the second queue after acquiring one of the plurality of the first type of commands stored in the first queue.

11. The method for controlling the information processing apparatus according to claim 10, further comprising setting the nonvolatile semiconductor storage with a setting to prioritize the first queue over the second queue.

12. The method for controlling the information processing apparatus according to claim 10, further comprising, in a state in which the first queue stores the plurality of the first type of commands, checking whether the second type of command is stored in the second queue after acquiring all of the first type of commands stored in the first queue by the nonvolatile semiconductor storage.

13. The method for controlling the information processing apparatus according to claim 12, further comprising acquiring the second type of command from the second queue by referring to the fact that the second type of command is stored in the second queue.

14. The method for controlling the information processing apparatus according to claim 10, wherein the second type of command is a command which is generated by accepting an operation via a remote user interface (RUI), the RUI to be used in a case where the information processing apparatus is operated by a different information processing apparatus.

15. The method for controlling the information processing apparatus according to claim 10,
- wherein the information processing apparatus includes a printer configured to print image data on a sheet, and
- wherein the first type of command is a command for reading the image data to be used by the printer, from the nonvolatile semiconductor storage.

16. The method for controlling the information processing apparatus according to claim 10,
- wherein the information processing apparatus includes a scanner configured to read a document and generate image data, and
- wherein the first type of command is a command for writing the image data generated by the scanner, to the nonvolatile semiconductor storage.

17. The method for controlling the information processing apparatus according to claim 10,
- wherein the information processing apparatus includes a volatile memory, and
- wherein the volatile memory includes the first queue and the second queue.

18. The method for controlling the information processing apparatus according to claim 10, wherein the nonvolatile semiconductor storage is an NVMESSD.

* * * * *